3,043,792
Patented July 10, 1962

---

3,043,792
PLASTICIZED RESINOUS COMPOSITION COMPRISING A VINYL CHLORIDE POLYMER AND A TRIALKYL TRIMESATE
Marvin J. Hurwitz, Elkins Park, Pa., assignor to Rohm & Haas Company, Philadelphia, Pa., a corporation of Delaware
No Drawing. Original application Apr. 3, 1958, Ser. No. 726,040. Divided and this application June 15, 1959, Ser. No. 820,112
6 Claims. (Cl. 260—31.8)

The novel plasticizers of this invention are trialkyl esters of trimesic acid in which each alkyl group has a carbon atom content of 7 to 8, inclusive.

Trialkyl trimesates having alkyl groups smaller than 7 are known; for various reasons they are generally not considered adequate for modern plasticizing requirements. Alkyl trimesates in which the alkyl group contains 9 carbon atoms or more exhibit limited compatibility when they are used in proportions exceeding about one-fourth of the amount of polyvinyl resin. This lack of retention of compatibility of the plasticizer ester in the resin is, of course, a very serious drawback since, regardless of how efficient and compatible a plasticizer is initially, unless the plasticizing effect extends for the life of the resin, its influence is merely temporary and illusory.

The alkyl trimesates of this invention, in which the alkyl groups only have 7 or 8 carbon atoms, present an unusual combination of desirable properties. Unlike the higher alkyl trimesates of the art, the instant ones are very useful in proportions of one-third or more on the amount of polyvinyl resin. At such level where full benefit of plasticization is obtained, they remain compatible with the resins for extended periods of time. In addition to this reliability, they exhibit low volatility during calendering; their resistance to soapy water extraction is very high and so is their stability to ultraviolet light exposure. In addition to these properties, the trimesate esters of this invention have the uncommon quality of imparting superior electrical resistivity to the resinous material.

For the purpose of defining the trimesate esters of this invention in which the alkyl group is limited to 7 or 8 carbon atoms, the term "alkyl" includes cycloalkyl, such as cyclopentyl, cyclohexyl, cycloheptyl, and cycloalkyl substituted with lower alkyl groups, such as methyl and ethyl groups. The alkyl groups of these esters are unsubstituted aliphatic branched or straight chain residues. They may be the same or different. Typical plasticizing esters of my invention are tri-n-heptyl trimesate, di(2,2-dimethylpentyl)n-octyl trimesate, tri(2,2-dimethylpentyl) trimesate, tri(2,4-dimethylpentyl) trimseate, tri(2-ethylpentyl) trimesate, tri(methyl pentyl carbinyl) trimesate, tri-n-octyl trimesate, tri(2-ethylhexyl) trimesate, tri(2,2-dimethylhexyl) trimesate, tri(2,2,4-trimethylpentyl) trimesate, tri(3,5-dimethylhexyl) trimesate, tri(3,4-dimethylhexyl) trimesate, tri(1-methyl cyclohexyl-1-methyl) trimesate, tri(5-methylheptyl) trimesate, tri(methyl hexyl carbinyl) trimesate, di(2-ethylhexyl)-n-heptyl trimesate. A valuable group of trimesic esters are trimesic acid esters of branched 7 or 8 carbon-containing alkanol mixtures obtained from the "Oxo" process and trimesic acid esters of mixtures of alkanols containing 7 to 8 carbon atoms obtained from the Oxo process. In my invention, the term triheptyl trimesate, trioctyl trimesate designates trimesic acid esterified with mixtures of alkanols, principally of the branched type obtained from the "Oxo" process and containing 8 and 7 atoms, respectively. Trialkyl esters of trimesic acid in which each alkyl group contains 8 carbon atoms are especially favored because of their unusual combination of superior properties.

The esters of my invention are prepared from trimesic acid which itself is obtainable from the oxidation of mesitylene. Esterification of trimesic acid may be effected with preferably an excess of one or more aliphatic unsubstituted straight- or branched-chain monohydric alkanols containing from 7 to 8 carbon atoms to form the corresponding esters.

These alkanols may be employed singly or in mixtures of alkanols of the same number of carbon atoms or not. The alkanols may be straight- or branched-chain alkanols. Mixtures of branched-chain alkanols may be obtained from the "Oxo" process by the catalytic reaction of an appropriate olefin or olefin mixture with carbon monoxide and hydrogen. The reaction occurs at temperatures in the order of 300° to 400° F., at pressures in the range of about 1000 to 3000 p.s.i., in the presence of a suitable catalyst ordinarily a heavy metal carbonyl such as cobalt carbonyl. The resulting aldehyde is subsequently hydrogenated to a primary monohydric alcohol. Mixtures of 7 and 8 carbon-containing "Oxo" alcohols may be employed for preparing the trimesic esters of my invention. Mixtures of "Oxo" alcohols containing from 7 to 8 carbon atoms may also be employed.

Esterification of trimesic acid is conveniently effected by heating acid with at least one appropriate alkanol, preferably by an excess over the stoichiometric amount, such as an excess of about 10% to 100% or more at a temperature range of about 200° to 250° C., preferably at reflux. Water of esterification is separated. An esterification catalyst, such as sulfuric acid, may be employed, if desired. Also, if desired, there may be used a water entrainer, such as a low-boiling solvent. When water evolution ceases, esterification is completed and excess alcohol is stripped off under vacuum. The esters of my invention are obtained in good yields.

The following illustrative examples further describe the preparation of typical esters of my invention. All parts are by weight.

EXAMPLE A

There are mixed 210 parts of trimesic acid with 536 parts of 2-ethylhexanol in a reaction flask adapted with a stirrer, a distillation column, and a receiver. The reaction mixture is heated gradually to and maintained at a refluxing temperature of 240° C. Heating is continued until there are collected in the receiver 54 parts of water. At that time, the pressure is reduced to 1 mm. mercury to strip off excess 2-ethylhexanol and these conditions are held until no more 2-ethylhexanol distills off. The reaction mixture is cooled and there are collected 519 parts of tri-2-ethylhexyl trimesate. This ester is found to have a molecular weight of 546±12 (calculated 552), a saponification number of 309 (calculated 304), a 100% Gardner-Holdt viscosity of J, an iodine number of 0.2, an acid number of 0.105, and a hydroxyl number of 0. The appearance of the ester is clear.

EXAMPLE B

There are charged 210 parts of trimesic acid and 478 parts of 2,2-dimethylpentanol to a reaction flask. The temperature is maintained at about 220° C. until there are removed 54 parts of water. Excess alcohol is stripped off under vacuum. There are collected 479 parts of tri(2,2-dimethylpentyl) trimesate.

In accordance with my invention, the specified alkyl esters of trimesic acid are very valuable in plasticizing vinyl chloride polymeric compositions. In the present specification and in the claims, the term "vinyl halide polymers" includes homopolymers of vinyl halides and copolymers of vinyl halides and monovinyl type monomers copolymerizable therewith. When copolymers of vinyl halides are employed, it is preferable that they contain a major proportion, i.e. at least 85%, of vinyl halide units. The vinyl chloride can be polymerized in bulk, in solution or as an emulsion of liquid vinyl chloride in water. While it is possible to polymerize the vinyl chloride in the presence of a primary plasticizer, this usually is not done in commercial processes. The invention is applicable to both the pre-plasticized vinyl polymers in this way and to the after-plasticized vinyl chloride polymers.

Typical vinyl compounds which may be used with vinyl chloride to form interpolymers to which this invention is applicable are vinyl acetate, vinylidene chloride, lower allyl esters, acrylic esters and vinyl alkyl ethers. As exemplary of these copolymer materials, there may be mentioned vinyl chloride with vinyl acetate, vinyl chloride with vinyl butyrate, vinyl chloride with vinyl propionate, interpolymers of vinyl chloride with 5% to 20% of vinylidene chloride, interpolymers of vinyl chloride and methyl acrylate, such as 80% vinyl chloride with 20% methyl acrylate, tripolymers of vinyl chloride, vinylidene chloride and 2-ethylhexyl acrylate, copolymers of vinyl chloride with ethyl acrylate, copolymers of vinyl chloride and butyl acrylate, copolymers of vinyl chloride, acrylonitrile, and the like. While the above copolymers may contain upwards of 50% chloride by weight of the copolymers, those having at least 85% vinyl chloride are preferred.

Plasticizers ordinarily are incorporated in vinyl chloride polymers by mixing the powdered resin with the liquid plasticizer followed by mixing and/or kneading and then by curing the mix at an elevated temperature, for example, within the range from 150° to 200° C., on hot rolls or in a heated mixer such as a Werner-Pfleiderer or Banbury mixer. The proportion of plasticizer employed will depend upon the initial properties of the resin and of the desired effect. Proportions of plasticizer are based on 100 parts of polyvinyl resin. On that basis, there may be employed 10 to 200 parts of plasticizer per 100 parts of resin. For greater benefits, it is preferable to employ 30 to 60 parts. In conjunction with plasticizers of my invention, there may be employed fillers, lubricants, pigments, stabilizers as described hereinafter.

The alkyl esters of trimesic acid of my invention may be used in conjunction with other common primary plasticizers, such as DOP, dioctyl adipate, trioctyl phosphate, polymeric plasticizers, epoxides, and the like. Moreover, the esters of this invention may be employed in conjunction with antioxidants, such as phosphites, amines and phenols, also with pigments, colors, fillers and polymer stabilizers, such as organo tin compounds like dibutyltin laurate.

The following resinous compositions further illustrate valuable aspects of my invention.

In these compositions, there are employed the trialkyl esters of my invention. In composition B, these esters are substituted by DOP.

| Composition A: | Parts | Composition B: |
|---|---|---|
| Polyvinyl chloride | 65 | (Same as A) |
| Trimesic alkyl ester | 35 | DOP 35 |
| Tribase E (lead silicate-lead sulfate salt) | 5 | (Same as A) |
| Clay filler | 15 | |
| Lubricants | 0.3 | |

The plasticizing trimesic esters of my invention and the other ingredients are incorporated with powdered vinyl chloride polymer and compounded on differential rolls. The compositions are individually fluxed and milled on a roller mill at 325° F. until they were uniform. They are then sheeted off the mill at a thickness of 10 mils.

The physical and mechanical properties of the resinous compositions plasticized with trimesic alkyl esters of this invention are tested in accordance with the following standard tests:

TEST 1

*Activated carbon volatility.*—2" squares of weighed specimens are placed between 2-inch layers of activated carbon in sealed glass jars which are maintained at 90° C. for 24 hours. The specimens are removed, dusted free of carbon, and reweighed.

TEST 2

*Soapy water extraction.*—3" squares of weighed specimens are immersed in a 1% aqueous solution of Ivory soap at 90° C. for 24 hours, after which they are thoroughly washed, dried, and reweighed.

TEST 3

*Hexane extraction.*—Weighed samples are immersed in white, lead-free hexane at 25° C. for two hours, after which they are thoroughly dried and reweighed.

TEST 4

*Resistance to degradation by ultraviolet light (Fade-Ometer).*—Samples of film of 0.01 inch thickness are exposed in the Atlas Fade-Ometer. The films are removed at regular intervals, conditioned for one hour at 25° C. and 50 percent relative humidity, and examined for development of tack, spew, stiffening, discoloration, and embrittlement. Failure of a film is indicated when it cracks upon being folded sharply upon itself after the one-hour conditioning period. All films are exposed in standard exposure frames and masks without backing.

TEST 5

*Torsional modulus at low temperatures.*—A 2¼ x ¼ sample is cut and mounted in a Tinius-Olsen stiffness tester, which measures the torsional modulus of plastic at various temperatures. The temperature at which a specimen has a torsional modulus of 135,000 lbs./square in., known at $T_f$ or $T_{135,000}$, is determined. This roughly corresponds to the "brittle point" obtained by cantilever apparatus.

TEST 6

*Electrical properties.*—Electrical properties of the compositions of this invention are tested by determinations of volume resistivity. Volume resistivity has been shown to have excellent correlation with insulation resistance. The tests are carried out on a specimen of the resinous compositions, molded into a standard 4 cavity A.S.T.M mold to give specimens of 6" x 6" x approximately 0.75". The procedure is followed to determine volume resistivity is fully described in "Rubber Age," pages 105 to 108, April 1956, C. E. Balmer and R. F. Coyne, and in "Resin Review," pages 3 to 9, vol. 6, No. 1, Rohm & Haas Company.

The electrical properties in terms of insulation resistance are tested by subjecting the standard specimens to a significant number of volume resistivity tests. The samples are subjected to temperatures of (a) 90° C. at 50° relative humidity,
(b) 60° after immersion of 20 hours and water-heated at 60° C., and
(c) 75° C. after immersion for 24 hours.

This test is valuable for determining retention of electrical properties.

The following Table I shows mechanical, physical and electrical properties of typical trialkyl esters of trimesic acid of this invention.

Table I
PERFORMANCE DATA

| | Permanence Properties, Percent Loss in Weight | | | Electrical Properties, Volume Resistivity (ohm-cms.×10¹²) | | Ret. of Elec. Prop., Immersion in water at 75° C. for 24 Hrs., Vol. Resistivity (ohm-cms.×10¹²) | Low Temp. Flex. ($T_f$)° C. | Ultraviolet Light Stability, Exposure Hrs. |
|---|---|---|---|---|---|---|---|---|
| | Activated Carbon Volatility | Soap Extra. at 90° C. | Hexane Extraction | 90° C. Dry | 60° C. Wet | | | |
| DOP | 9–14 | 8–11 | 32 | 1.4 | 6.8 | 2.6 | −31 to −34 | c.a. 360 |
| THT | 1.2 | 0.5 | 29 | 9.0 | 21.0 | 8.0 | −26 | c.a. 360 |
| TOT | 0.9 | 0 | 33 | 8.9 | 20.0 | 8.6 | −30 | c.a. 360 |

Key: DOP—di(2-ethylhexyl)phthalate; THT—tri(2,2-dimethylpentyl)trimesate; TOT—tri(2-ethylhexyl)trimesate.

With respect to other properties such as Shore hardness, compatibility and heat stability, the resinous compositions of my invention quite satisfactorily compare with conventional resinous compositions.

Plasticized compositions of polyvinyl chloride containing varying amounts of the trialkyl esters of trimesic acid of this invention show plasticizing effect depending on the amount of plasticizer employed. In amounts of 10 parts by weight of the resinous composition, a definite improvement may be noticed. In all cases, there may be observed an improvement over compositions plasticized with DOP, an especially remarkable improvement in electrical properties is noted. For electrical applications, a total proportion of plasticizer in the range of 30 to 50 parts, based on the amount of polyvinyl, may be recommended.

Formulations are prepared which contain instead of a single plasticizing ester of this invention a mixture of THT—10 parts, and
TOT—39 parts The resulting compositions have most satisfactory permanence in the resin and excel with respect to their electrical properties. Resinous compositions plasticized with other mixtures of esters of this invention have comparable desirable properties.

THT and TOT are individually, evenly incorporated into copolymer compositions similar to composition (a) in all respects except that polyvinyl chloride is replaced by copolymers of (C) Vinyl chloride, 87 parts and vinyl acetate, 13 parts;
(D) Vinyl chloride, 80 parts and vinylidene chloride, 20 parts;
(E) Vinyl chloride, 80 parts and methyl acrylate, 20 parts;
(F) Vinyl chloride, 95 parts and vinyl isobutyl ether, 5 parts.

In all resinous compositions, there are noted improved performance over DOP plasticized resinous compositions, particularly with respect to permanence properties and electrical resistivity.

When there are incorporated into 65 parts of polyvinyl chloride 35 parts of the mixed ester, di-2-ethylhexyl 2,2-dimethylpentyl trimesate, the resulting resinous composition has improved properties, particularly electrical properties, over resinous compositions plasticized with DOP.

Incorporation of 100 parts of tri(2,2-dimethylpentyl) trimesate with 100 parts of polyvinyl chloride gives a highly plasticized composition having permanence properties and electrical properties superior to those imparted by DOP.

Composition (A) is plasticized with 45 parts of ester of trimesic acid and an eight carbon-containing mixture of alkanols derived from the Oxo process. Polyvinyl chloride content is adjusted to 55 parts. Performance data demonstrate that the resulting composition has permanence and electrical properties superior to those imparted by DOP. Similar results are obtained wherein the plasticizer is a triheptyl trimesate, which is obtained from a 7 carbon-containing mixture of alkanols resulting from the Oxo process. Electrical properties are especially noteworthy. A group of esters of my invention which come within special consideration are tri(2,2-dimethylpentyl) trimesate, tri(2,2-dimethylhexyl) trimesate. The resulting resinous compositions show decisive advantages over conventional compositions.

The performance data of typical esters of this invention prove that they possess an uncommon and unexpected combination of good stability and permanence properties allied with excellent electrical properties.

The compositions of my invention are very useful in numerous industrial applications. They are particularly valuable for electrical wiring, printing rolls, cable coverings, floorings, pliable thin sheetings, and film finishes for textiles. For wire coating about 30% or less plasticizer is used and the material is extruded directly around the wire. They may also be used in the preparation of plastizoles, plastigels, and organosols, i.e. vinyl chloride polymer plasticizer paste with or without volatile solvents.

The present application is a division of application Serial No. 726,040, filed April 3, 1958, now abandoned.

I claim:

1. A plasticized resinous composition comprising a polymer selected from the group consisting of homopolymers of vinyl chloride and copolymers of vinyl chloride with an ethylenically unsaturated monomer copolymerizable therewith, said copolymer containing at least 80% by weight of vinyl chloride copolymerized therewith and said plasticized resinous composition having incorporated therein about 10 to 200% by weight of tri(alkyl)trimesates which are simple esters in which the alkyl groups contain from 7 to 8 carbon atoms.

2. The plasticized resinous composition of claim 1, in which the polymer is a homopolymer of vinyl chloride.

3. A plasticized resinous composition comprising a polymer selected from the group consisting of homopolymers of vinyl chloride and copolymers of vinyl chloride with an ethylenically unsaturated monomer copolymerizable therewith, said copolymer containing at least 80% by weight of vinyl chloride copolymerized therewith and said plasticized resinous composition having incorporated therein at least ⅓ by weight of tri(alkyl)-trimesates which are simple esters in which the alkyl groups contain from 7 to 8 carbon atoms.

4. A plasticized resinous composition comprising a polymer selected from the group consisting of hopopolymers of vinyl chloride and copolymers of vinyl chloride with an ethylenically unsaturated monomer copolymerizable therewith, said copolymer containing at least 80% by weight of vinyl chloride copolymerized therewith and said plasticized resinous composition having incorporated therein about 10 to 200% by weight of tri(alkyl)trimesates in which the alkyl group contains 8 carbon atoms.

5. The plasticized resinous composition of claim 4 in which the trimesate is tri(2-ethylhexyl)trimesate.

6. A plasticized resinous composition comprising a polymer selected from the group consisting of homopolymers of vinyl chloride and copolymers of vinyl chloride with an ethylenically unsaturated monomer copolymerizable therewith, said copolymer containing at least 80% by weight of vinyl chloride copolymerized therewith and said plasticized resinous composition having incorporated therein about 10 to 200% by weight of tri(alkyl)-trimesates in which the alkyl group contains 7 carbon atoms.

References Cited in the file of this patent
UNITED STATES PATENTS

| | | |
|---|---|---|
| 1,993,737 | Graves et al. | Mar. 12, 1935 |
| 2,650,908 | Beears | Sept. 1, 1953 |